US012674505B2

(12) United States Patent
Eskridge, III et al.

(10) Patent No.: US 12,674,505 B2
(45) Date of Patent: Jul. 7, 2026

(54) ANTI-PINCH ELECTRIC LINEAR ACTUATOR FOR ELECTRIC ADJUSTABLE FURNITURE

(71) Applicants: Horace Robert Eskridge, III, Nicholasville, KY (US); Chuan Huang Shih, Changhua County (TW); Yu-Chi Yang, Changhua County (TW); Wen-Chi Hsu, Changhua County (TW)

(72) Inventors: Horace Robert Eskridge, III, Nicholasville, KY (US); Chuan Huang Shih, Changhua County (TW); Yu-Chi Yang, Changhua County (TW); Wen-Chi Hsu, Changhua County (TW)

(73) Assignee: Star Seeds Co. LTD, Changhua County (TW)

( * ) Notice: Subject to any disclaimer, the term of this patent is extended or adjusted under 35 U.S.C. 154(b) by 0 days.

(21) Appl. No.: 19/201,179

(22) Filed: May 7, 2025

(65) Prior Publication Data

US 2025/0369503 A1      Dec. 4, 2025

(30) Foreign Application Priority Data

May 30, 2024    (TW) ................................. 113120056

(51) Int. Cl.
| | |
|---|---|
| *F16H 25/20* | (2006.01) |
| *F16H 25/24* | (2006.01) |
| *A47C 17/86* | (2006.01) |

(52) U.S. Cl.
CPC ..... *F16H 25/2015* (2013.01); *F16H 25/2472* (2013.01); *A47C 17/86* (2013.01); *F16H 2025/2062* (2013.01)

(58) Field of Classification Search
CPC ............. F16H 25/2015; F16H 25/2472; F16H 2025/2062; A61G 7/05; A47C 17/86
See application file for complete search history.

(56) References Cited

U.S. PATENT DOCUMENTS

| | | | | | |
|---|---|---|---|---|---|
| 5,139,484 | A | * | 8/1992 | Hazon ................. | A61M 5/1456 604/154 |
| 7,543,516 | B2 | * | 6/2009 | Siefert ................ | A61M 5/1456 74/424.78 |

FOREIGN PATENT DOCUMENTS

| | | | | | |
|---|---|---|---|---|---|
| CN | 111939378 | A | * | 11/2020 | ............ A61M 5/007 |
| CN | 220745223 | U | * | 4/2024 | |
| CN | 114013632 | B | * | 8/2024 | ........... B64C 13/505 |

* cited by examiner

*Primary Examiner* — William C Joyce
(74) *Attorney, Agent, or Firm* — Michael Coblenz

(57) ABSTRACT

An anti-pinch electric linear actuator includes an inner tube extending into an outer tube and having inner and outer ends located inside and outside the outer tube respectively, a lead screw extending inside the outer and inner tubes, a nut screwed onto the lead screw and located inside the outer tube, and a sensing unit. The nut has an abutment portion for being stopped by the inner end of the inner tube. The sensing unit is disposed to the outer tube, the inner tube, or the nut for detecting whether the abutment portion of the nut is contacted by the inner end of the inner tube. As such, the anti-pinch electric linear actuator can effectively prevent injury to people, other living beings, or objects while it is used in electric beds or chairs during the operation of the electric beds or chairs.

7 Claims, 5 Drawing Sheets

ANTI-PINCH ELECTRIC LINEAR ACTUATOR FOR ELECTRIC ADJUSTABLE FURNITURE

CROSS REFERENCE TO RELATED APPLICATIONS

Not applicable.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to an electric linear actuator, and more particularly to an anti-pinch electric linear actuator adapted for being used in electric beds, chairs, or the like for providing an anti-pinch function.

2. Description of the Related Art

Electric linear actuators are commonly used as driving components in electric beds. An example includes U.S. Pat. No. 11,399,998, which discloses a foldable bed with linear actuators that move and allow the adjustment of a back support frame and a thigh support frame relative to the base frame of the bed. When the electric linear actuator extends, it drives the back supporting frame or the thigh supporting frame to swing upwards relative to the base frame of the bed. Conversely, when the electric linear actuator retracts, the back supporting frame or the thigh supporting frame swings downwards relative to the base frame. Taking the swing motion of the back supporting frame for example, when the back supporting frame swings downwards and approaches the base frame, if any obstruction, whether children, pets, or human hands or feet, accidentally enter the space between the back supporting frame and the base frame, they may be pinched or crushed by the downward movement of the movable component of the electric bed. Similarly, if other objects like furniture are mistakenly placed in the aforesaid space, they might get damaged or damage the electric bed. There is a need, therefore, for a method or device to prevent an electric bed with movable components from pinching or crushing objects, people, or other living beings such as pets.

SUMMARY OF THE INVENTION

The present invention has been accomplished in view of the above-noted circumstances. It is an objective of the present invention to provide an anti-pinch electric linear actuator, which can effectively prevent people, other living beings, or objects from being pinched or crushed by the movement of part of an electric bed or other furniture such as a chair during the operation of the electric bed or chair. While the present invention is drawn to an anti-pinch, or anti-crush mechanism for a foldable or adjustable bed, it is to be understood that the present anti-pinch linear actuator can be used with any type of movable or adjustable article of furniture, such as a recliner or other adjustable chair having a movable back or leg rest, or any other article of furniture having a movable component, to prevent pinching or crushing or compression of an object in the movable part of the furniture.

To attain the above and other objectives, the present invention provides an anti-pinch electric linear actuator comprising an outer tube, an inner tube, a lead screw, a nut, and a sensing unit. The inner tube extends into the outer tube in a way that the inner tube has an inner end located inside the outer tube, and an outer end located outside the outer tube. The lead screw extends inside the outer tube and the inner tube. The nut is screwed onto the lead screw and located inside the outer tube. The nut has an abutment portion, against which the inner end of the inner tube is stoppable. The sensing unit is disposed to the outer tube, the inner tube, or the nut for detecting whether the abutment portion of the nut is in contact with the inner end of the inner tube.

With the above-mentioned technical features, when the nut is driven by the lead screw to move outward, the abutment portion will push the inner tube to extend outward, which will extend the actuator to move the adjustable component of the bed or other article of furniture. When the nut is driven by the lead screw to move inward the actuator will retract, and if the inner tube receives the axially external force from the weight of the adjustable component of the bed, the inner tube will remain abutted against the abutment portion and move inward along with the nut. However, when the nut is driven by the lead screw to move inward and the inner tube does not receive an axially external force because something is blocking the adjustable component of the furniture and thus preventing a downward force, the inner tube will stay in place and disengage from the abutment portion of the nut. When this happens the sensor will provide this information to the controller, which will either stop or reverse movement of the nut. As a result, the anti-pinch electric linear actuator may effectively prevent people, other living beings, or objects from being pinched while it is used in an electric bed or chair during the operation of the electric bed or chair.

The present invention is an anti-pinch electric linear actuator, comprising: an outer tube; an inner tube extending into the outer tube in a way that the inner tube has an inner end located inside the outer tube, and an outer end located outside the outer tube; a lead screw extending inside the outer tube and the inner tube; a motor to drive the nut, said motor mounted in the outer tube; a nut screwed onto the lead screw and located inside the outer tube, the nut having an abutment portion, against which the inner end of the inner tube is stoppable; a sensing unit disposed to the outer tube, the inner tube, or the nut for detecting whether the abutment portion of the nut is in contact with the inner end of the inner tube; and wherein the inner tube of the linear actuator will move when the abutment portion of the nut is in contact with the inner end of the inner tube, but will not move when the abutment portion of the nut is not in contact with the inner end of the inner tube. Wherein the sensing unit of the anti-pinch electric linear actuator comprises two conductive wires disposed on the inner tube; each of the two conductive wires has a contact end located at the inner end of the inner tube; when the two contact ends of the two conductive wires are in contact with the abutment portion of the nut, the two conductive wires are electrically connected with each other, but when the abutment portion of the nut is not in contact with the inner end of the inner tube the two conductive wires are not electronically connected with each other. Wherein the abutment portion of the nut is a conductive gasket. Wherein when the nut of the anti-pinch electric linear actuator is driven by the lead screw to move outward, the abutment portion pushes the inner tube to extend outward; wherein when the nut is driven by the lead screw to move inward and the inner tube receives an axially external force, the inner tube abuts against the abutment portion and moves inward along with the nut; wherein when the nut is driven by the lead screw to move inward and the inner tube does not receive the axially external force, the inner tube stays in place and disengages from the abutment portion of the nut, and the electric connection of the sensing unit is broken thereby signaling the nut to stop the movement of the actuator. Wherein further, the outer tube of the anti-pinch electric linear actuator is attached to a base frame of a bed and wherein said outer end of said inner tube is attached to a movable component of the bed, whereby the anti-pinch electric linear actuator moves the movable component of the bed, and wherein further if a foreign object is placed between the moveable component of the bed and the base frame of the bed, the foreign object prevents the movable component of producing the axially external force and causes the inner tube to disengage from the abutment portion of the nut and stop the movement of the actuator.

BRIEF DESCRIPTION OF THE DRAWINGS

The present invention will become more fully understood from the detailed description given herein below and the accompanying drawings which are given by way of illustration only, and thus are not limitative of the present invention.

DETAILED DESCRIPTION OF THE INVENTION

Figure 1:
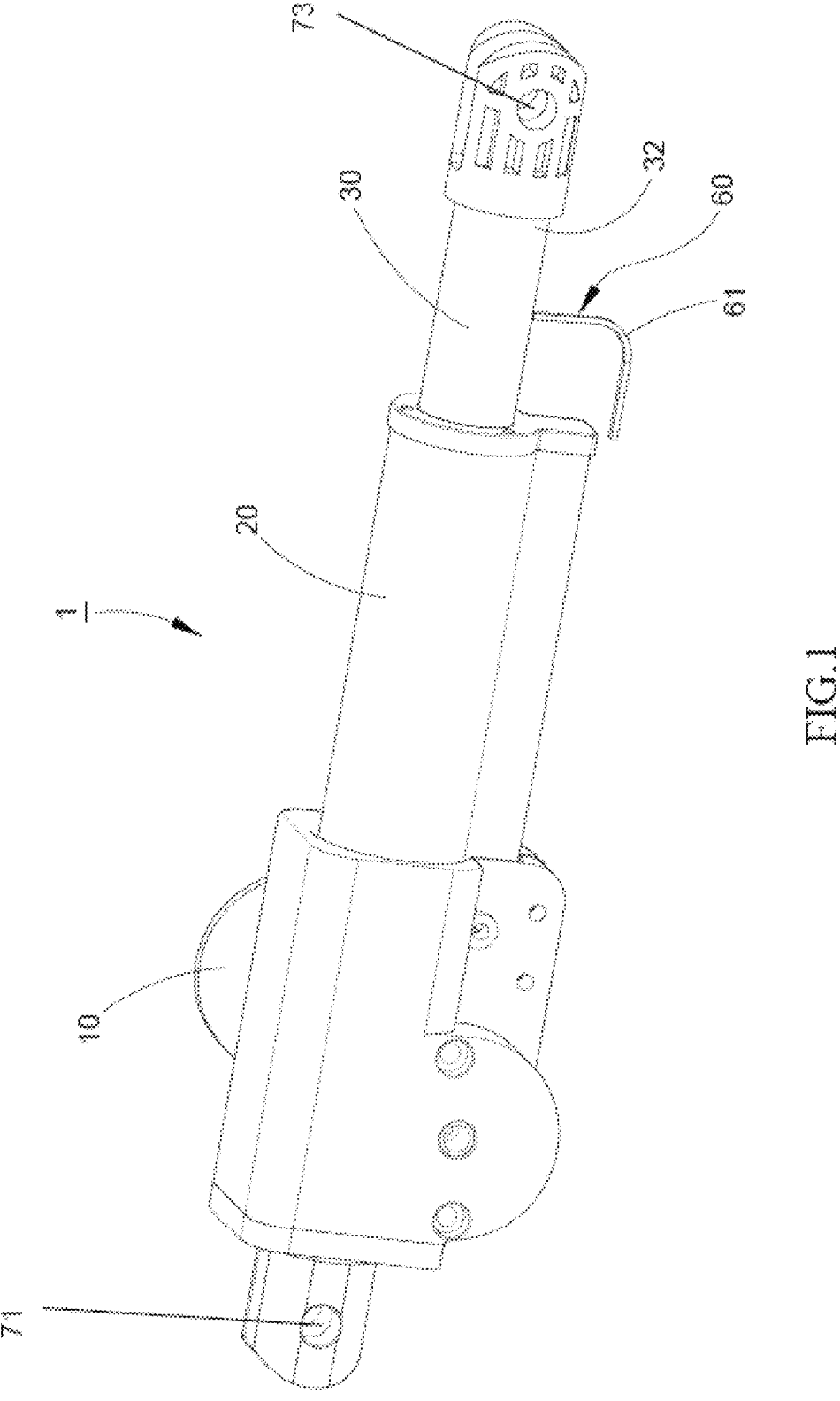
FIG. 1 is a perspective view of an anti-pinch electric linear actuator according to a first preferred embodiment of the present invention.
Figure 2:
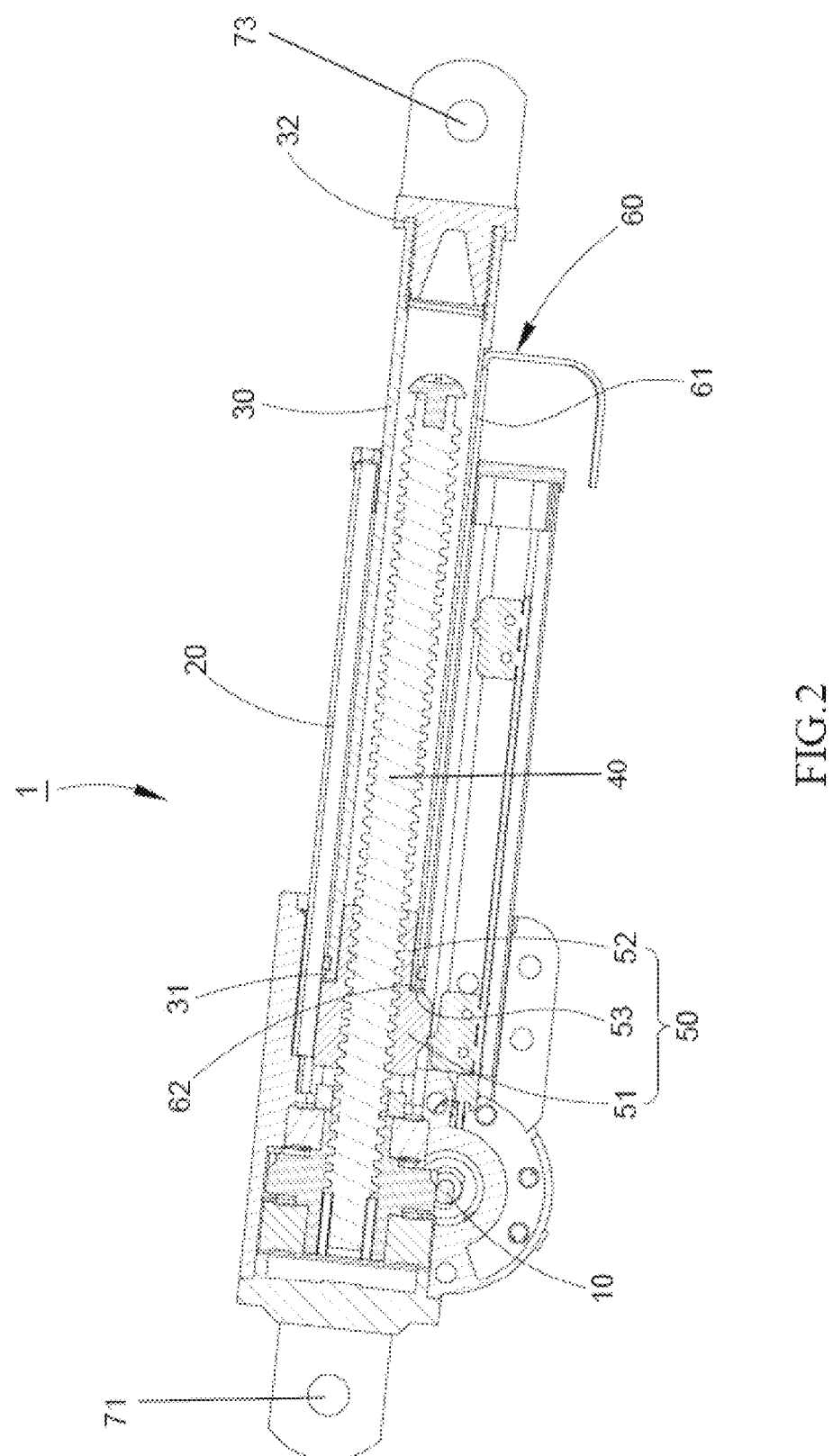
FIG. 2 is a cut-away cross-sectional view of the anti-pinch electric linear actuator, showing the main components of the first preferred embodiment of the present invention.

The structure and technical features of the present invention will be described in detail hereunder by two embodiments and accompany drawings. As shown in FIGS. 1-2, an anti-pinch electric linear actuator 1 provided by a first preferred embodiment of the present invention comprises a motor 10, an outer tube 20, an inner tube 30, a lead screw 40, a nut 50, and a sensing unit 60. For convenience of illustration, the left side of FIG. 1 is referred to as the base side, and the right side is referred to as the moving side. There is a base attachment 71 on the base side that attaches the linear actuator 1 to the base frame of the bed or other article of furniture, and an adjustable frame attachment 73 that attaches the moving end of the linear actuator to the adjustable frame of the bed, or other moving portion of an article of furniture.

The motor 10 serves as the power source for the anti-pinch electric linear actuator 1. The motor 10 is mounted at the base side of the outer tube 20, and rotates the lead screw 40, which is disposed within the outer tube 20. The lead screw 40 is rotatably attached adjacent to the motor 10, and extends inside the outer tube 20 and the inner tube 30, and is drivable by the motor 10 to rotate. The nut 50 is disposed on the lead screw 40 and moves towards or away from the motor 10 depending upon which way the lead screw 40 is rotated by the motor 10. The motor 10 is controlled by a standard controller. The outer tube 20 extends in a direction perpendicular to the output shaft of the motor 10. However, in other embodiments, there is no limitation on the relative angle between the outer tube 20 and the output shaft of the motor 10. The inner tube 30 extends into the outer tube 20 and can extend outwards and extract inwards relative to the outer tube 20. That is, the outer tube 20 and the inner tube 30 collectively serve as a telescope tube. The inner tube 30 has an inner end 31 located inside the outer tube 20, and an outer end 32 extending outside the outer tube 20.

The nut 50 is screwed onto the lead screw 40 and located inside the outer tube 20 and the inner tube 30. When the motor 10 rotates it turns the lead screw 40, and the nut 50 moves up away from the motor 10 or down towards the motor along the lead screw 40. The nut 50 has a large diameter portion 51, a small diameter portion 52 located at the front end of the large diameter portion 51 and extending into the inner tube 30, and an abutment portion 53 located at the junction of the large diameter portion 51 and the small diameter portion 52 for being stopped by the inner end 31 of the inner tube 30. Generally, the inner end 31 abuts the abutment portion 53, and as the lead screw 40 turns the nut 50, the nut 50 pushes the inner tube 30 away from the motor 10 with the abutment portion 53 pushing on the inner end 31 of the inner tube 30. The outer diameter of the small diameter portion 52 is smaller than that of the large diameter portion 51. The abutment portion 53 may comprise or be realized as an electrically conductive gasket.

The sensing unit 60 includes two conductive wires 61 disposed on the inner tube 30. The two conductive wires 61 extend from the inner end 31 along the wall of the inner tube 30 towards the outer end 32, and further extend outwardly to electrically connect to a controller (not shown). The two conductive wires 61 each have a contact end 62 located at the inner end 31 of the inner tube 30. When the two contact ends 62 contact the abutment portion 53 of the nut 50, the two conductive wires 61 are electrically connected with each other, and this electrical connection can be sensed by the controller. In this way, the sensing unit 60 can detect whether the abutment portion 53 of the nut 50 is in contact with the inner end 31 of the inner tube 30. To simplify components, the nut 50 may be made of conductive material, meaning that the abutment portion 53 is not an independent component but a part of the nut 50.

Figure 3:
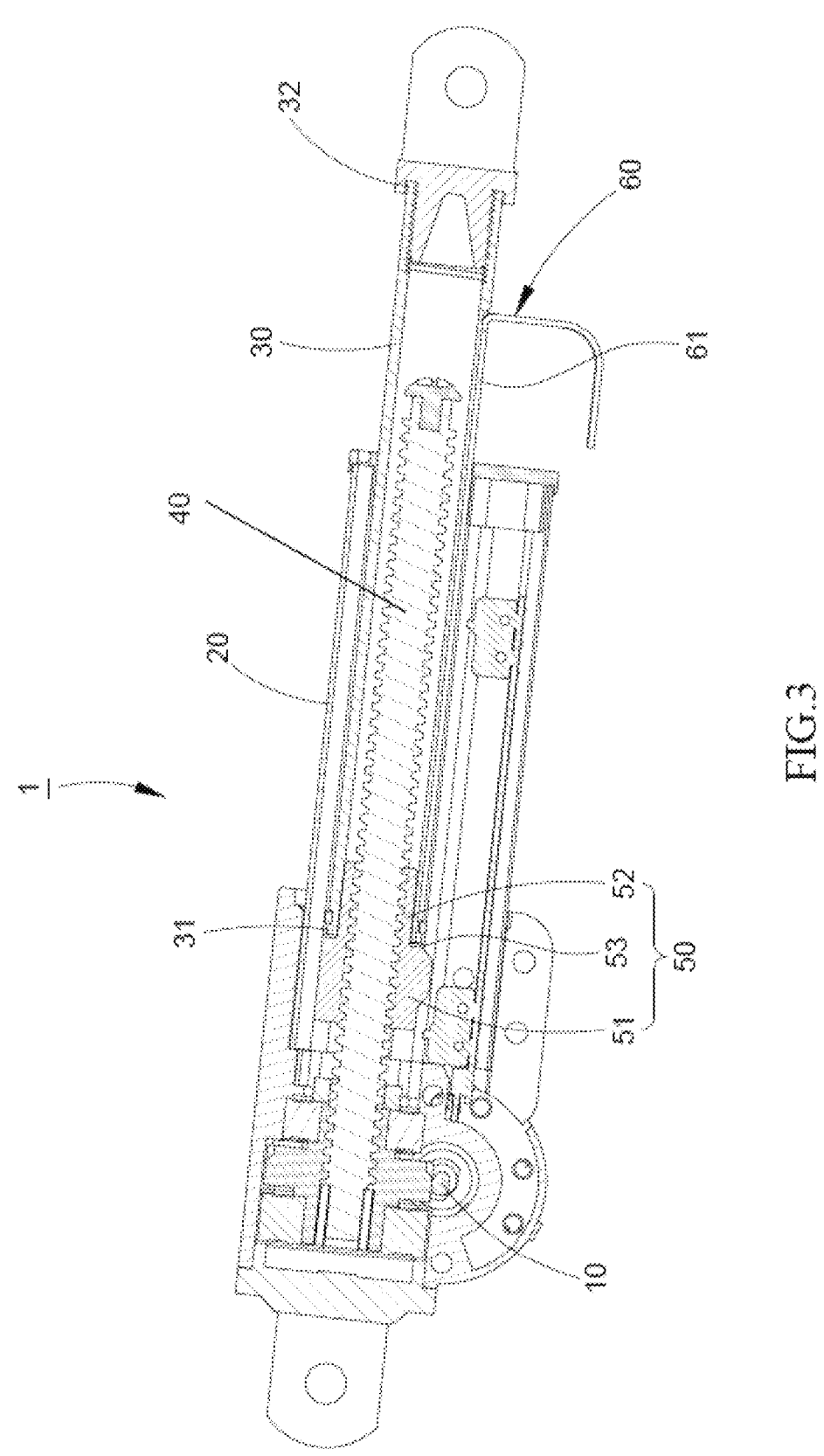
FIG. 3 is a cross-sectional schematic views showing the anti-pinch electric linear actuator of the first preferred embodiment of the present invention showing the abutment portion of the nut in contact with the inner end of the tube.

With the above-disclosed structural features, when the nut 50 is driven by the lead screw 40 to move outward and away from the motor 10, the abutment portion 53 pushes the inner end 31 of the inner tube 30 to force the inner tube 30 to extend outward from the outer tube 20, as shown in FIG. 3.

5

6

Figure 4:
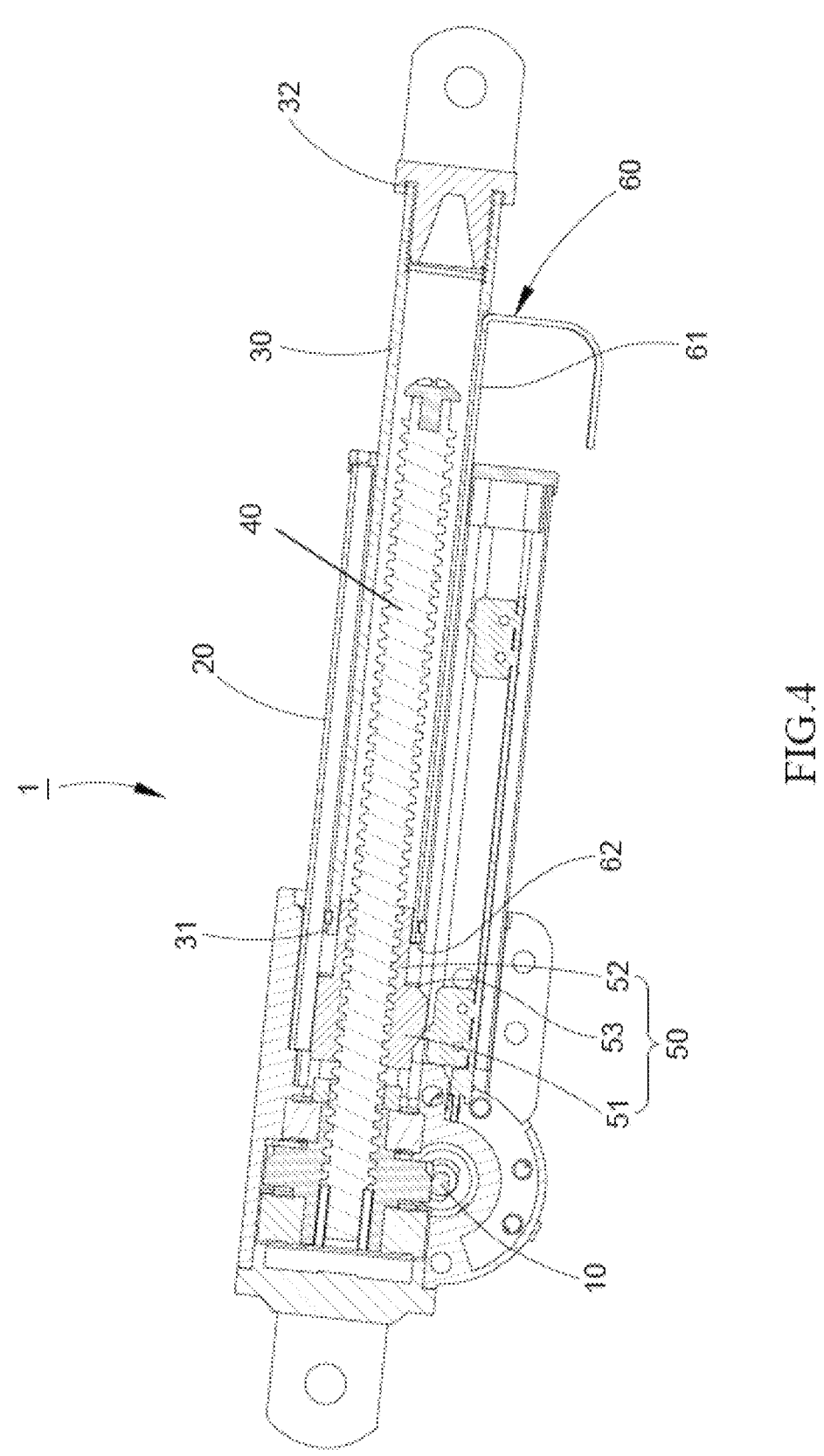
FIG. 4 is a cross-sectional schematic views showing the anti-pinch electric linear actuator of the first preferred embodiment of the present invention showing the abutment portion of the nut not in contact with the inner end of the tube.

In operation on a bed, this forces the adjustable frame attachment 73 away from the base attachment, and moves the movable portion of the bed, either the adjustable back support frame or the adjustable thigh support frame, rotating them upwardly. When the nut 50 is driven by the lead screw 40 to move inward towards the motor 10, thus rotating the back support or thigh support frames downwardly, there are two scenarios: one is when the inner tube 30 receives an axially external force, the inner tube 30 still abuts against the abutment portion 53 and moves inward along with the nut 50 to retract into the outer tube 20, as shown in FIG. 3; the other is when the inner tube 30 does not receive an axially external force, the inner tube 30 stays in place and disengages from the abutment portion 53 of the nut 50, as shown in FIG. 4. This is explained in more detail below.

This can be explained best when the anti-pinch electric linear actuator 1 is installed on an electric bed (not shown). When the motor 10 turns the lead screw 40 the nut 50 moves outward and causes the inner tube 30 to extend outward, moving the adjustable frame attachment 73 outward, causing the back (or thigh) supporting frame to swing upward relative to the base frame. When the back (or thigh) supporting frame is moved off of the base frame of the bed there will be a gravitation force created by the adjustable frame onto the actuator 1, which creates an axially external force on the inner tube 30. When the nut 50 moves inward, because the gravitational force or axially external force on the back (or thigh) supporting frame exerts on the inner tube 30, the inner end 31 of inner tube 30 will remain abutted against the abutment portion 53, and then move inward along with the nut 50 to retract into the outer tube 20, such that the back supporting frame swings downward relative to the base frame. When any object, including people, pets or other living beings or objects, are jammed between the back (or thigh) supporting frame and the base frame, the back supporting frame is unable to continue swing downward due to the obstruction of the foreign objects. The result of this is that the axially external force applied by the back (or thigh) supporting frame to the inner tube 30 is stopped or counteracted by the foreign objects. This means that the inner tube 30 no longer receives the axially external force, such that the inner tube 30 will stay in place, and the nut 50 will continue to move, and the inner end 31 will disengage from the abutment portion 53 of the nut 50, as the nut 50 continues downward, thus breaking the electronic connection between the components. As soon as the sensing unit 60 senses that the abutment portion 53 of the nut 50 has disengaged from the inner end 31 of the inner tube 30 due to the break in the electronic connection, the sensing unit 60 immediately sends a signal to the controller. After receiving this signal, the controller may control the anti-pinch electric linear actuator 1 to reverse its direction of rotation, causing the nut 50 to stop moving or even to move outward, thereby extending the inner tube 30 again and driving the back (or thigh) supporting frame to swing upward, releasing the pressure of the back supporting frame against the foreign objects. Thus, the anti-pinch electric linear actuator 1 effectively prevents injuries to people, other living beings, or objects during the operation of the electric bed or chair, thereby achieving the objective of the present invention.

Figure 5:
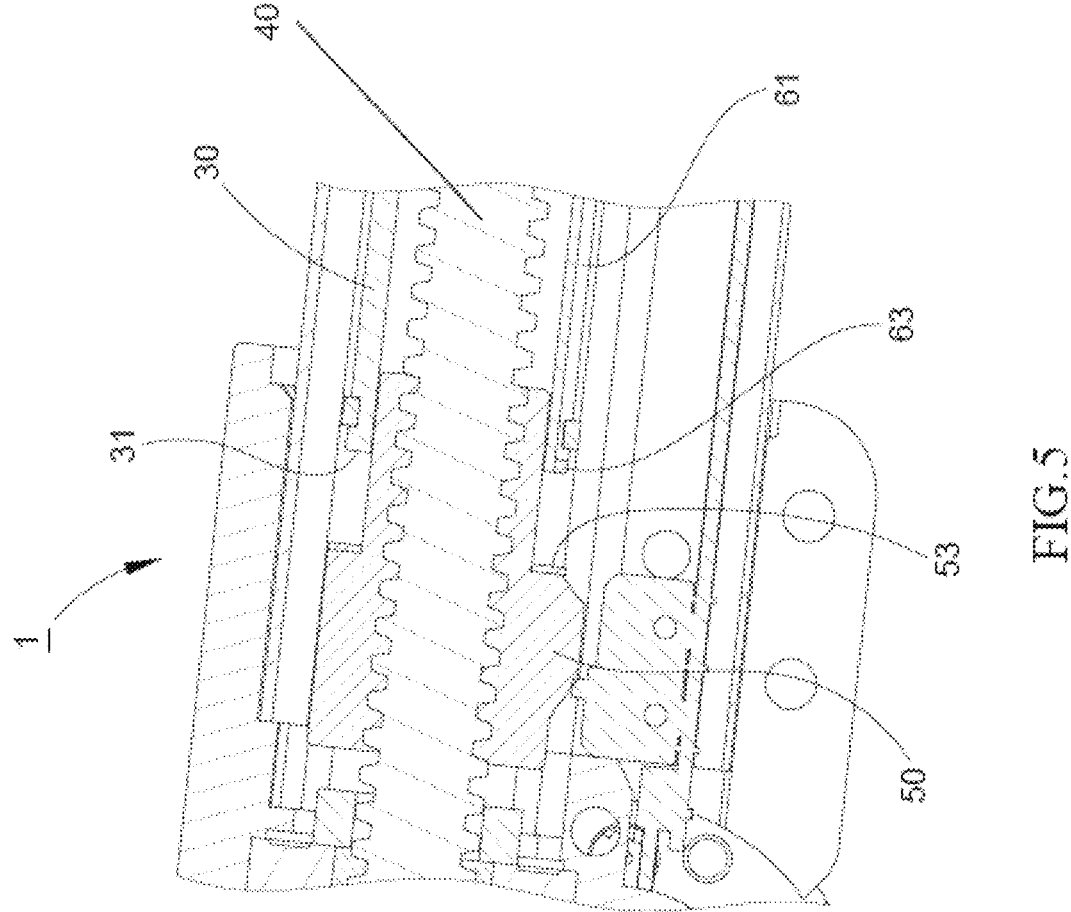
FIG. 5 is a sectional view of a part of an anti-pinch electric linear actuator according to a second preferred embodiment of the present invention.

Based on the above-mentioned structural features, various modifications to the anti-pinch electric linear actuator 1 may be made. For example, FIG. 5 shows a part of an anti-pinch electric linear actuator 1 provided by a second preferred embodiment of the present invention. The anti-pinch electric linear actuator 1 provided in this embodiment is basically similar to that of the first embodiment, except that that the sensing unit 60 further comprises a micro limit switch 63 disposed at the inner end 31 of the inner tube 30 and electrically connected with the two conductive wires 61. When the inner end 31 of the inner tube 30 abuts against the abutment portion 53 of the nut 50, the limit switch 63 is pressed by the abutment portion 53. When the inner end 31 of the inner tube 30 disengages from the abutment portion 53 of the nut 50 due to the presence of an object blocking the movement of the adjustable frame, the limit switch 63 is no longer pressed by the abutment portion 53. The signal of the limit switch 63 can be transmitted to the controller through the two conductive wires 61, thus achieving the effect of anti-pinch. In other embodiments, the sensing unit may be disposed at the nut 50, and the limit switch 63 may be disposed at the abutment portion 53.

Furthermore, the sensing unit may be realized by any suitable types of sensors, such as optical sensing devices (for example, infrared sensing devices or laser sensing devices) or magnetic reed switches, and may be installed on the inner tube 30, the outer tube 20, or the nut 50. Any such readily conceivable structural changes should be encompassed within the scope of the claims of the patent application.

We claim:

1. An anti-pinch electric linear actuator for the movable components of adjustable furniture, the anti-pinch electric linear actuator comprising:
    an outer tube;
    an inner tube extending into the outer tube in a way that the inner tube has an inner end located inside the outer tube, and an outer end located outside the outer tube;
    a lead screw extending inside the outer tube and the inner tube;
    a nut screwed onto the lead screw and located inside the outer tube, the nut having an abutment portion, which the inner end of the inner tube can contact the abutment portion and the inner end of the inner tube can separate from the abutment portion;
    a motor to drive the nut, said motor mounted in the outer tube; and
    a sensing unit disposed to the outer tube, the inner tube, or the nut for detecting whether the abutment portion of the nut is in contact with the inner end of the inner tube; and
    wherein the inner tube of the linear actuator will move when the abutment portion of the nut is in contact with the inner end of the inner tube, but will not move when the abutment portion of the nut is not in contact with the inner end of the inner tube.

2. The anti-pinch electric linear actuator of claim 1:
    wherein the sensing unit comprises two conductive wires disposed on the inner tube;
    each of the two conductive wires has a contact end located at the inner end of the inner tube; when the two contact ends of the two conductive wires are in contact with the abutment portion of the nut, the two conductive wires are electrically connected with each other, but when the abutment portion of the nut is not in contact with the inner end of the inner tube the two conductive wires are not electronically connected with each other.

3. The anti-pinch electric linear actuator of claim 2, wherein the abutment portion of the nut is a conductive gasket.

4. The anti-pinch electric linear actuator of claim 2;
    wherein when the nut is driven by the lead screw to move outward, the abutment portion pushes the inner tube to extend outward;

wherein when the nut is driven by the lead screw to move inward and the inner tube receives an axially external force, the inner tube abuts against the abutment portion and moves inward along with the nut;

wherein when the nut is driven by the lead screw to move inward and the inner tube does not receive the axially external force, the inner tube stays in place and disengages from the abutment portion of the nut, and the electric connection of the sensing unit is broken thereby signaling the nut to stop the movement of the actuator.

5. The anti-pinch electric linear actuator of claim 4 wherein said outer tube is attached to a base frame of a bed and wherein said outer end of said inner tube is attached to a movable component of the bed, whereby the anti-pinch electric linear actuator moves the movable component of the bed, and wherein further if a foreign object is placed between the moveable component of the bed and the base frame of the bed, the foreign object prevents the movable component of producing the axially external force and causes the inner tube to disengage from the abutment portion of the nut and stop the movement of the actuator.

6. The anti-pinch electric linear actuator of claim 1, wherein the sensing unit comprises a limit switch disposed at the inner end of the inner tube or at the abutment portion of the nut.

7. The anti-pinch electric linear actuator of claim 1, wherein the sensing unit comprises an optical sensing device or a magnetic reed switch.

\* \* \* \* \*